United States Patent
Pfeffer et al.

(10) Patent No.: US 7,992,490 B2
(45) Date of Patent: Aug. 9, 2011

(54) AUTOMATIC BY-PASS CONTROL SYSTEM FOR MEAT INJECTION MACHINE AND METHOD OF USING SAME

(75) Inventors: Daniel W. Pfeffer, West Des Moines, IA (US); Michael S. Simpson, Norwalk, IA (US); Craig A. Smiens, Ankeny, IA (US)

(73) Assignee: Stork Townsend Inc., Des Moines, IA (US)

( * ) Notice: Subject to any disclaimer, the term of this patent is extended or adjusted under 35 U.S.C. 154(b) by 1407 days.

(21) Appl. No.: 11/419,253

(22) Filed: May 19, 2006

(65) Prior Publication Data

US 2007/0270749 A1    Nov. 22, 2007

(51) Int. Cl.
*B23Q 15/00*    (2006.01)
*B02C 25/00*    (2006.01)

(52) U.S. Cl. ............... 99/487; 99/458; 99/357; 99/325; 99/516; 99/522; 99/527; 99/532; 99/535; 99/486; 60/446; 91/1; 91/48; 92/5 R; 92/48; 92/68; 92/70; 222/2; 222/17; 222/20; 222/55; 222/62; 222/61; 222/258; 222/261; 222/262; 222/263; 222/373; 222/389; 222/394; 251/62; 251/63.5; 251/129.04; 417/44.2; 417/26; 417/313; 137/488

(58) Field of Classification Search ............ 99/485–487, 99/357, 325, 516, 522, 527, 532, 535; 60/399, 60/446; 417/213, 44.2, 26, 313; 91/1, 48; 92/5 R, 48, 68, 70; 137/488; 222/2, 17, 222/20, 55, 57, 62, 61, 258, 261–263, 373, 222/389, 394; 251/62–63.5, 129.04
See application file for complete search history.

(56) References Cited

U.S. PATENT DOCUMENTS

| | | | | |
|---|---|---|---|---|
| 3,734,001 A | * | 5/1973 | Poster | 99/532 |
| 4,331,071 A | * | 5/1982 | Niccolls | 99/532 |
| 4,768,598 A | | 9/1988 | Reinhardt | |
| 5,035,580 A | | 7/1991 | Simonette | |
| 5,773,060 A | * | 6/1998 | Smith | 426/281 |
| 6,014,926 A | | 1/2000 | Tanaka et al. | |
| 6,378,542 B1 | * | 4/2002 | DuHack | 137/8 |
| 6,497,176 B2 | | 12/2002 | Basile et al. | |
| 6,914,531 B1 | * | 7/2005 | Young | 340/606 |
| 6,962,485 B2 | | 11/2005 | Bennett et al. | |
| 6,976,421 B2 | * | 12/2005 | Hansen et al. | 99/487 |
| 2003/0079786 A1 | | 5/2003 | Diana et al. | |
| 2003/0198722 A1 | * | 10/2003 | Johnston et al. | 426/438 |
| 2005/0074515 A1 | * | 4/2005 | Hansen et al. | 425/557 |

FOREIGN PATENT DOCUMENTS

| | | |
|---|---|---|
| DE | 19960302 | 6/2001 |
| JP | 2004078347 | 3/2004 |

* cited by examiner

*Primary Examiner* — Sang Paik
*Assistant Examiner* — Brett Spurlock

(57) ABSTRACT

A by-pass control system for a meat injection system has a variable speed pump that transports fluid to a meat injection machine. Excess fluid is transported to a by-pass control valve. The valve has a moveable piston disposed therein that separates the valve into a fluid chamber and an air chamber. The piston moves back and forth based on the relationship between fluid pressure and air pressure. Sensors are disposed within or through the lid or the valve to sense the position of the piston. A controller is connected to the sensors and the variable speed pump and adjusts the speed of the pump based on the position of the piston.

12 Claims, 5 Drawing Sheets

US 7,992,490 B2

AUTOMATIC BY-PASS CONTROL SYSTEM FOR MEAT INJECTION MACHINE AND METHOD OF USING SAME

BACKGROUND OF THE INVENTION

This invention is directed toward an automatic by-pass control system for a meat injection machine, and more specifically to a system that adjusts fluid pressure to maintain a desired injection percentage.

Systems utilizing meat injection machines are well known in the art. For example, U.S. Pat. No. 6,497,176 by Basile et al., incorporated herein by reference in its entirety, discloses one such meat injection machine. Presently, injection pressure is dependent on two variables—by-pass pressure and pump speed.

By-pass pressure corresponds to air pressure provided to a by-pass piston. This variable is set by a machine operator, and normally is adjusted after performing a weight check on a meat product and an observation that the injection machine is pumping either above or below an acceptable range.

The pump speed determines the fluid flow that is available to the injector heads. Problems occur if the pump speed is set too low to supply sufficient fluid pressure and flow to the injector heads, or too high where there is too much pressure and flow sent to injector heads. Both situations lead to inefficiencies such as unnecessary turbulence in the tank causing foaming, fluid temperature increase due to additional fluid work, premature filter blockage leading to more frequent filter changes, and under injection of the meat product. Unless the operator is skilled in manually adjusting air pressure and pump speed to control injection pressure and fluid flow, these problems are likely. Therefore, there exists a need in the art for a system that addresses these problems.

An objective of the present invention is to provide an injection system that maintains an acceptable injection pressure.

Another objective of the present invention is to provide an injection system that automatically adjusts air pressure and/or fluid pressure to maintain an acceptable injection percentage.

A further objective of the present invention is to provide a by-pass valve that senses an increase or decrease in fluid pressure.

These and other objectives will be apparent to those skilled in the art based on the following written description.

SUMMARY OF THE INVENTION

A by-pass control system for a meat injection system has a variable speed pump that transports fluid to a meat injection machine. Excess fluid is transported to a by-pass control valve. The valve has a moveable piston disposed therein that separates the valve into a control chamber and a master/command chamber. The piston moves back and forth based on the relationship between fluid pressure and air pressure. A pair of sensors are disposed within or outside the valve to sense the position of the piston. A controller is connected to the sensors and the variable speed pump and adjusts the speed of the pump based on the position of the piston. Alternatively, a single sensor is disposed within or outside the cylinder which senses movement of the piston.

DETAILED DESCRIPTION OF THE PREFERRED EMBODIMENT

Figure 1:
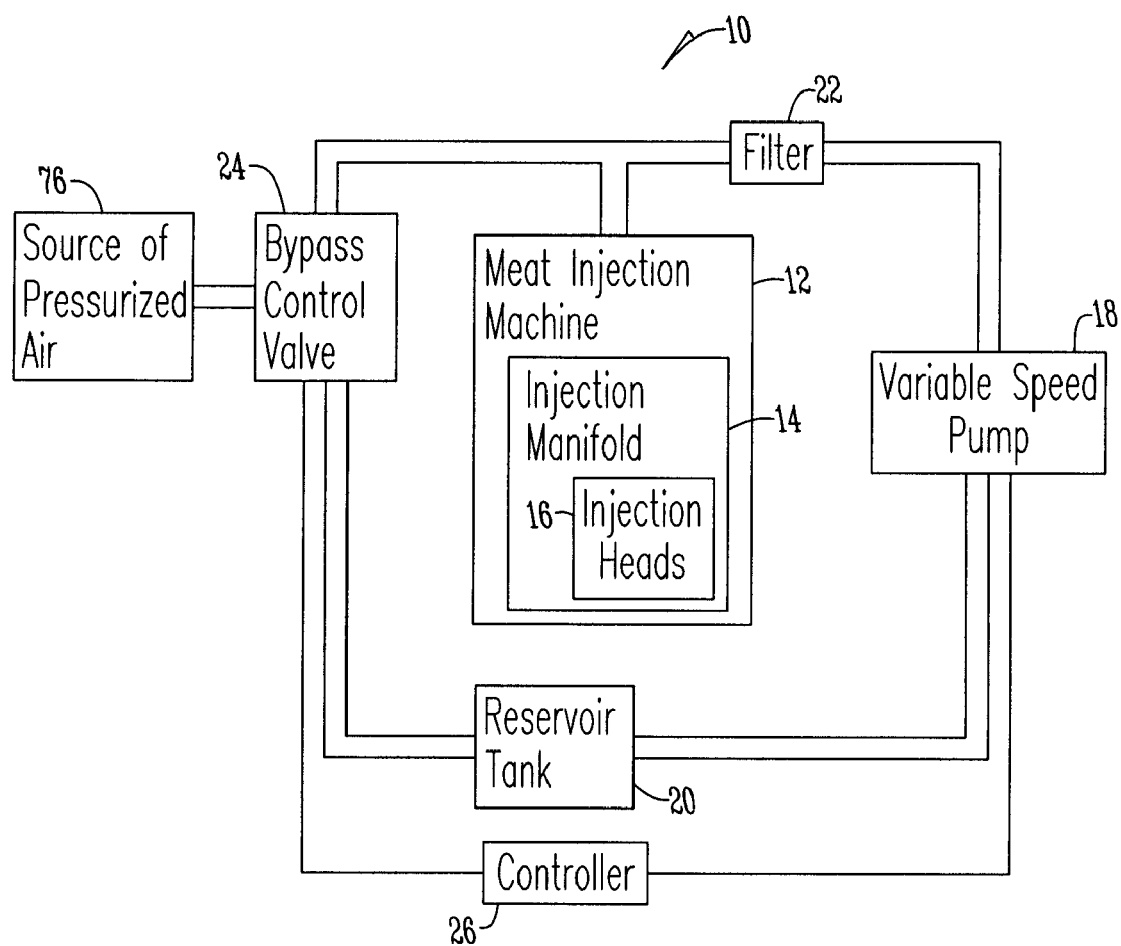
FIG. 1 is a schematic drawing of a by-pass control system.
Figure 2:
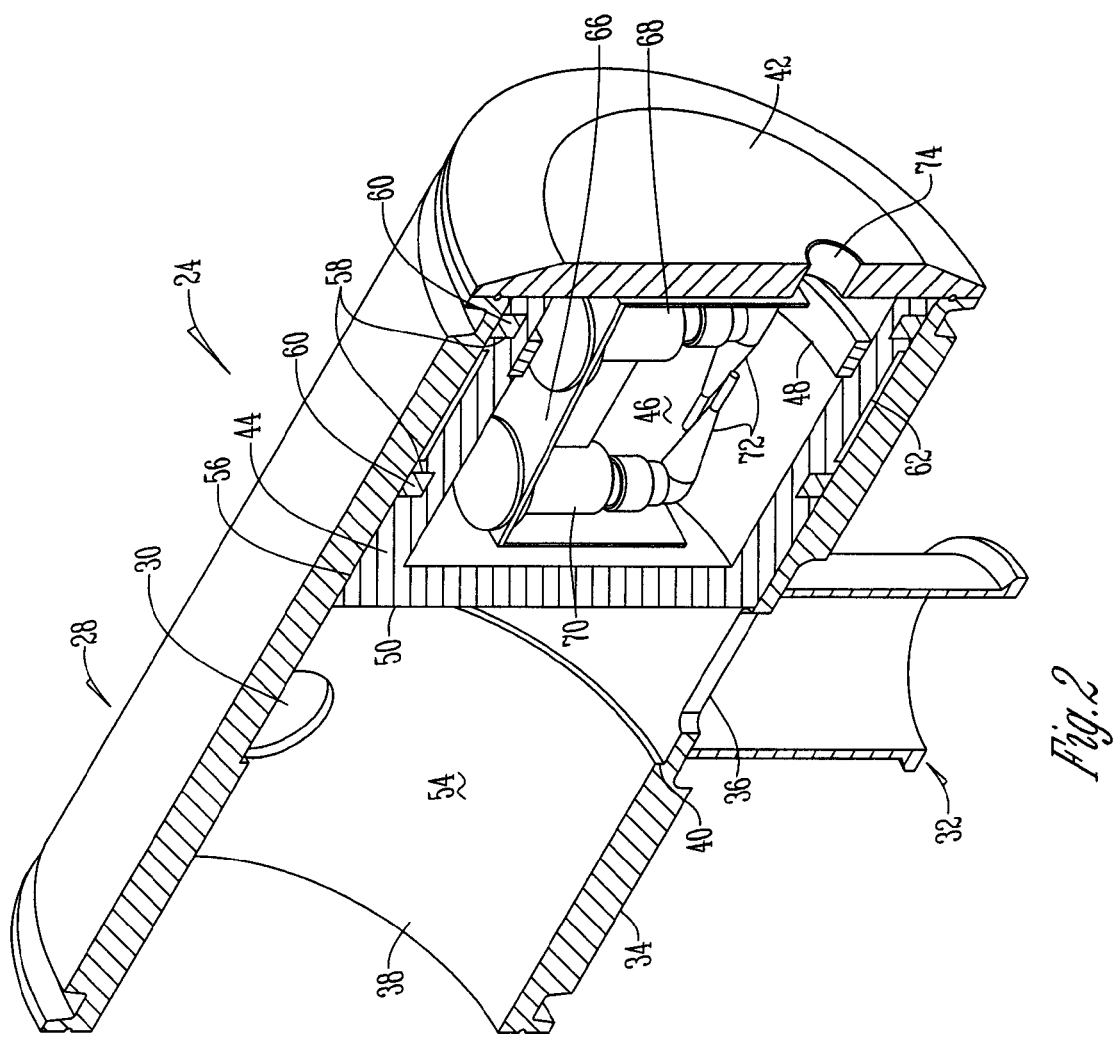
FIG. 2 is a cut-away perspective view of a by-pass control valve.
Figure 3:
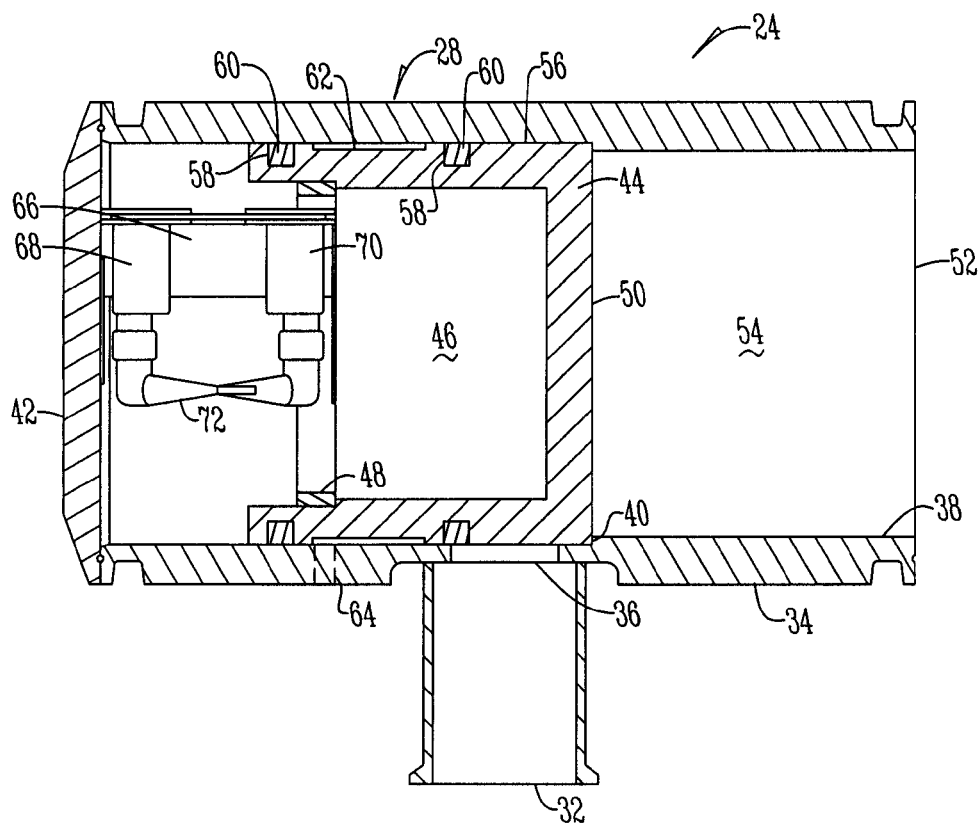
FIG. 3 is a sectional view of a by-pass control valve in a fully closed position.
Figure 4:
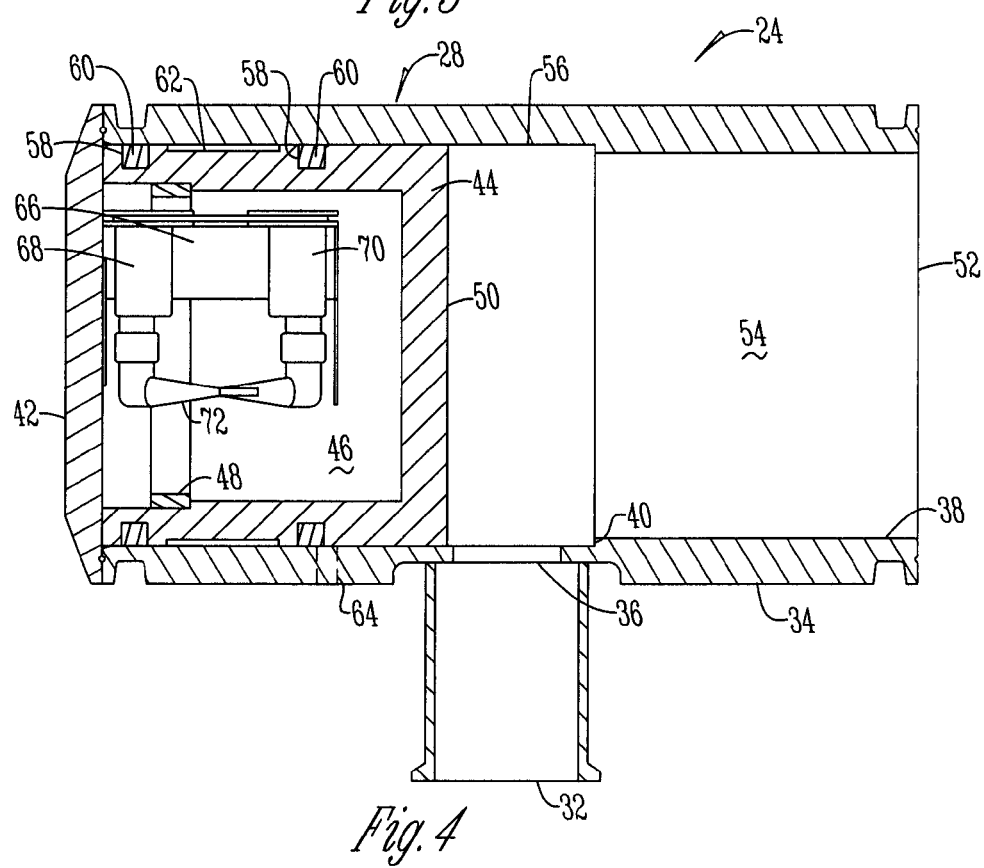
FIG. 4 is a sectional view of a by-pass control valve in a fully open position.

Referring to the Figures, the by-pass control system 10 has a meat injection machine 12 which includes an injection manifold 14 with injection heads 16. In fluid communication with the injection machine 12 is a variable speed pump 18 that pumps fluid such as fluid from a reservoir tank 20, through a filter 22 to the injection machine 12. Excess fluid that is not injected flows past the injection machine 12 to a by-pass control valve 24. The by-pass control valve 24 is in fluid communication with, and returns fluid to the reservoir tank 20. A controller 26 is electrically connected to the variable speed pump 18 and the by-pass control valve 24.

The by-pass control valve 24 has a hollow cylindrical tube 28 with a fluid inflow port 30 at one end and a fluid outflow port 32 positioned on the sidewall 34 of the tube 28. The inflow port 30 is in fluid communication with, and receives fluid from the pump 18 that by-passes the injection machine 12, and the outflow port 32 is in fluid communication with the reservoir tank 20. The outflow port 32 is of any shape including, but not limited to, a slot 36 that extends longitudinally along the length of tube 28.

On the interior surface 38 of the sidewall 34 of the tube 28, positioned between the inflow port 30 and the outflow port 32 is a ridge 40 that acts as a stop. A cap or lid 42 is connected to the end of the tube 12 opposite the inflow port 30, the lid 42 also acting as a stop.

Slidably disposed within tube 12 between the ridge 40 and the lid 42 is a piston 44. The piston 44 is of any shape, but preferably has a hollow chamber 46 that in combination with the lid 42 and the sidewall 34 of the tube 12, form an air chamber. Mounted to the interior of the chamber 46 is a sensing ring 48.

The closed end 50 of the piston 44 in combination with the sidewall 34 and end 52 of tube 28 form a fluid chamber 54. The outer surface 56 of the piston 44 slidably engages the interior surface 38 of the tube 28 and prevents the flow of fluid from the fluid chamber 54 when the piston 44 covers all or part of the outflow port 32. To prevent leakage of fluid from the fluid chamber 54 to the air chamber 46, one or more grooves 58 are cut into the outer surface 56 that receive a seal 60 such as an O-ring. In one embodiment, the outer surface 56 of the piston has a recess 62 that is in communication with an egress 64 that allows small amounts of fluid to drain prior to reaching the air chamber 46.

A bracket 66 is mounted to the lid 42 and extends into the air chamber 46. Mounted to the bracket 66, in spaced alignment, are a first and a second sensor 68, 70. The sensors 68, 70 are of any type and preferably are rugged and capable of withstanding a high pressure wash down. An uprox®+ by Turck is one such proximity sensor.

Cables 72 are connected to the sensors 68, 70 at one end and to the controller 26 at the opposite end. The sensors 68, 70 are spaced from the sensing ring 48 a distance that enables the sensors 68, 70 to function accurately and consistently. If the sensors 68, 70 are too close they will detect the ring 48 too early, and if they are too far away, the sensors 68, 70 will activate too late or not at all. The sensors 68, 70 are positioned within the manufacturers recommended sensing range, from the sensing ring 48.

The spacing between the first sensor 68 and the second sensor 70 corresponds to the size of the outflow port 32 and is such that the piston 44 moves to a fully open position when it engages the lid 42, and a fully closed position when it engages ridge 40.

The lid 42 has a port 74. Connected to the port is a source of pressurized air 76 that supplies air pressure to the air chamber 46.

When the variable speed pump 18 is turned off, the air pressure forces the piston 44 within tube 28 toward the fluid inlet port 30 until the closed end 50 of the piston 44 engages stop 40.

Figure 5:
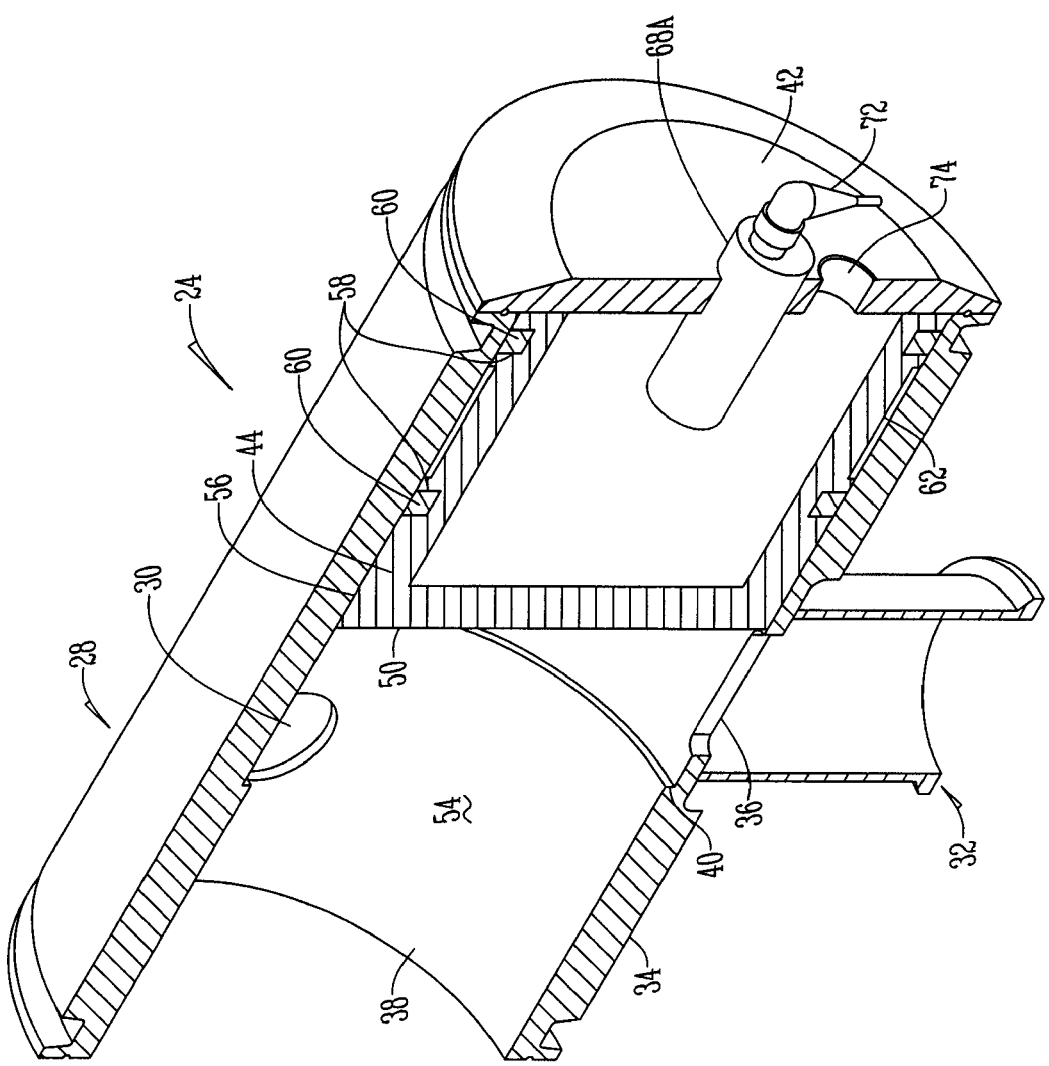
FIG. 5 is a perspective view of a by-pass control valve.
Figure 6:
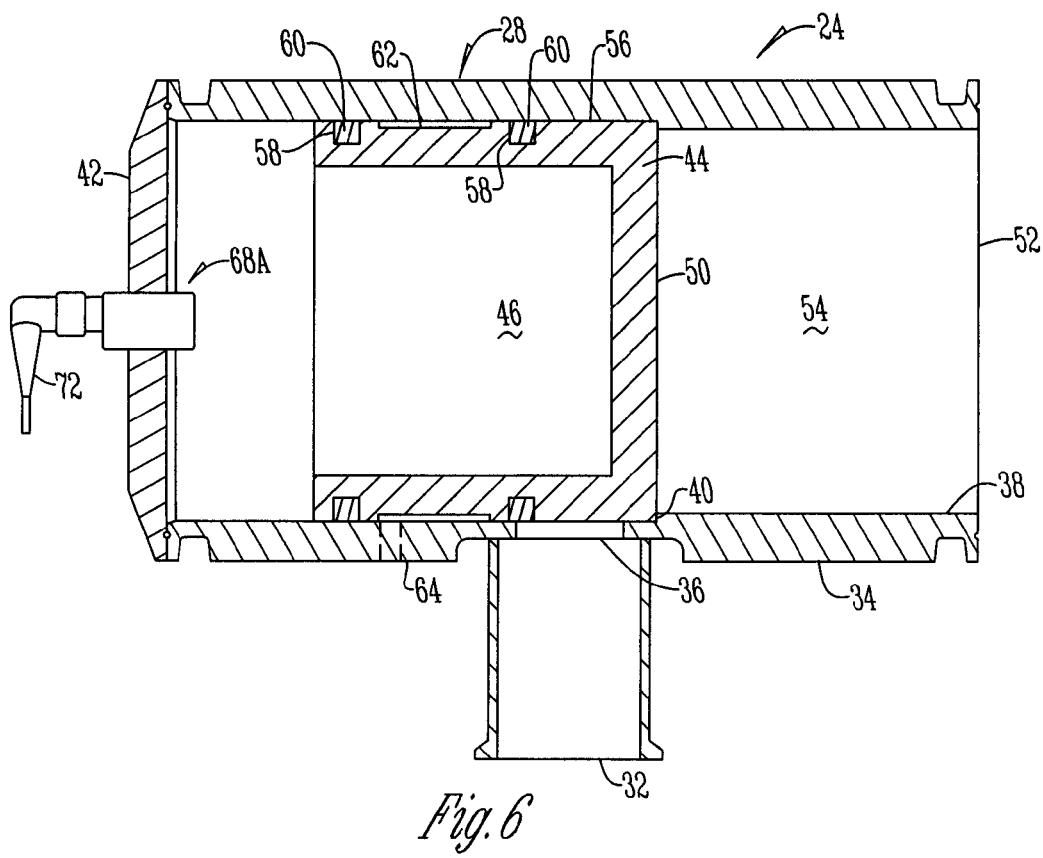
FIG. 6 is a sectional view of a by-pass control valve in a fully closed position.
Figure 7:
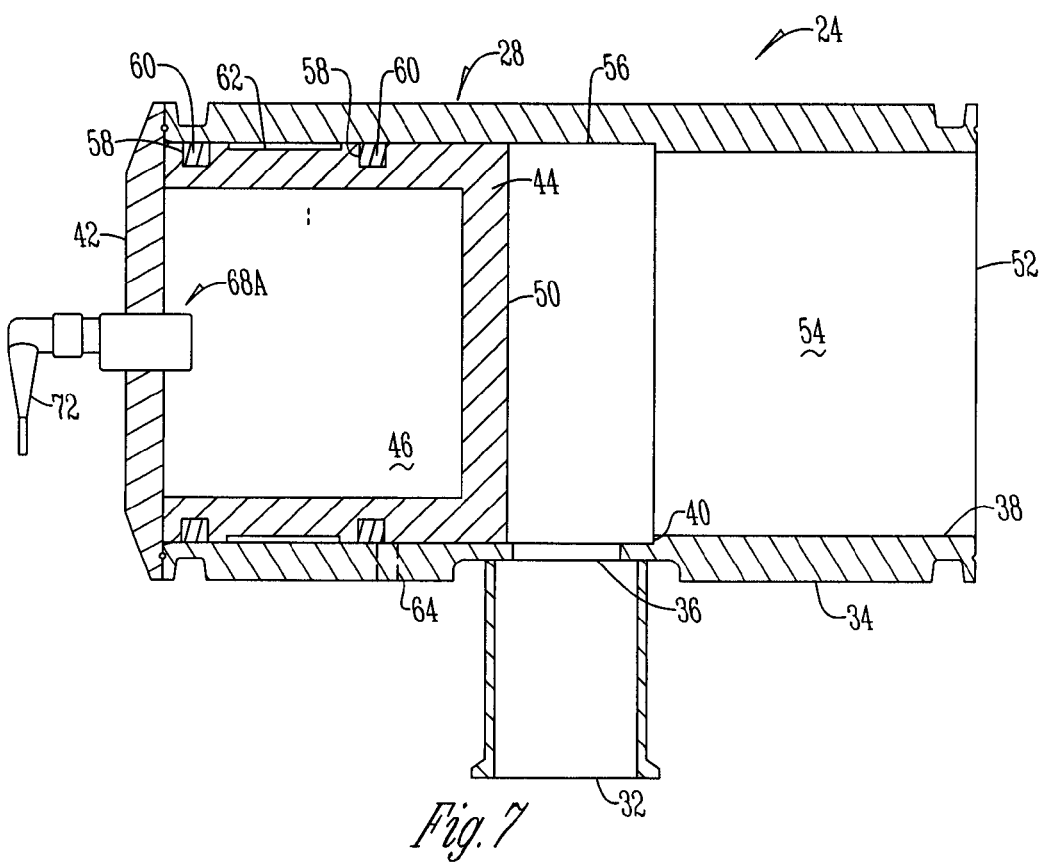
FIG. 7 is a sectional view of a by-pass control valve in a fully open position.

Alternatively, Cable 72 is attached to a photo electric sensor 68A mounted in the lid 42 which monitors the piston 44. One such sensor is a Banner Brand S18UIAQ. In this configuration there is no sensing ring required. The sensor monitors the piston 44 to determine the distance from the lid 42. This distance corresponds to the optimal flow of fluid through the valve. See FIG. 5.

In operation, a machine operator inputs a desired injection percentage into the controller 26. By selecting the injection percentage, the controller 26 sets the air pressure that is supplied to the master/command chamber 46 and also sets the speed of the variable speed pump 18 to create fluid pressure equal to the air pressure. When air pressure and fluid pressure are balanced, the position of the piston 44 within tube 28 is at mid-stroke where fluid is permitted to flow from the control chamber 54 out through the fluid outlet port 32.

When fluid pressure drops below air pressure the piston 44 moves toward end 52 of the tube 28 gradually closing off outflow port 32 and restricting flow until it reaches stop 40 where port 32 is fully closed. If fluid pressure drops to a point that sensor ring 48 triggers sensor 70, a signal is sent from sensor 70 to the controller 26, which automatically sends a signal to the variable speed pump 18 increasing the speed of the pump 18. Alternatively, when the photoelectric sensor 68A is triggered by the piston reaching stop 40 where port 32 is fully closed. If fluid pressure drops to a point that the distance of the piston from the sensor reaches a preset distance the sensor 68A is triggered. A signal is sent from the sensor 68A to the controller 26, which automatically sends a signal to the variable speed pump increasing the speed of the pump 18 or to the air source 76 decreasing air pressure. By increasing the speed of the pump 18, fluid pressure is increased until pressure builds up in the control chamber 54 causing the piston 44 to move toward lid 42. Once sensor ring 48 no longer triggers sensor 70, the signal from controller 26 to the variable speed pump 18 that increases the speed of pump 18 is deactivated and the pump speed is maintained. Alternatively, when a single sensor is used, the photoelectric sensor 68A monitors the piston distance and when the piston 44 reaches a predetermined distance from the lid 42, a signal is sent from sensor 68A to the controller 26 which automatically sends a signal to the variable speed pump 18 and the increasing pump speed command is deactivated and the pump speed is maintained.

When the pump 18 is operating at a speed that creates fluid pressure greater than the set air pressure, the piston 44 moves toward lid 42 gradually opening fluid outflow port 32 until the piston 44 reaches lid 42 and port 32 is fully opened. If fluid pressure increases to a point that sensor ring 48 triggers sensor 68, a signal is sent from sensor 68 to the controller 26 which automatically sends a signal to the variable speed pump 18 decreasing the speed of the pump 18. Alternatively, when a single sensor is used, the photoelectric sensor monitors the piston distance and when the piston reaches a predetermined distance from the lid 42, a signal is sent from sensor 68 to the controller 26 which automatically sends a signal to the variable speed pump 18 decreasing the speed of the pump 18. By decreasing the speed of the pump 18, fluid pressure is decreased until pressure falls in the fluid chamber causing air pressure to move piston 44 toward end 52 of tube 28. Once sensor ring 48 no longer trips sensor 68, the signal from controller 26 to the variable speed pump 18 that decreases the speed of the pump is deactivated and the pump speed is maintained.

Alternatively, when a single sensor is used, the photoelectric sensor 68A monitors the piston distance and when the piston is at a predetermined distance from the lid 42 the signal from the controller 26 to the variable speed pump that decreases the pump speed is deactivated and the pump speed is maintained. In this manner the piston 44 moves back and forth in relation to command/master air pressure and fluid pressure acting against one another within the by-pass control valve 24. Further, the speed of the variable speed pump 18 is automatically increased or decreased by controller 26 based on the sensed displacement of piston 44. As a result, pump speed is optimized, operator error eliminated, and the accuracy of meat injection increased.

Accordingly, an automatic by-pass control system for a meat injection machine, that at the very least meets all the stated objectives, has been disclosed.

What is claimed:

1. A valve for use with a meat injection system, comprising:
    a hollow elongated tube having at least one fluid inflow port and at least one fluid outflow port;
    a piston disposed within the tube that separates the tube into multiple chambers comprising a control chamber and a master/command chamber and is moveable to cover the outflow ports,
    at least one displacement sensor disposed within or outside the tube positioned to sense the movement of the piston; and
    a controller connected to a variable speed pump and the sensor and operable to adjust the speed of the variable speed pump based upon a sensed displacement of the piston by applying a pressure to the piston to regulate the outflow port.

2. The valve of claim 1 wherein at least one sensor is a proximity sensor.

3. The valve of claim 1 wherein at least one sensor ring is a photoelectric sensor.

4. The valve of claim 1 wherein the piston has a sensor ring that triggers the sensor when the ring is in close proximity.

5. The valve of claim 3 wherein the piston triggers the photoelectric sensor when the piston is in a preset proximity.

6. The valve of claim 1 wherein there are at least two sensors in spaced alignment to one another.

7. A by-pass control system for injecting meat with fluid, comprising:
    a meat injection machine,
    a variable speed pump connected to the injection machine to transport fluid to the injection machine,
    a by-pass control valve connected to the injection machine having a displacement sensor and a piston within the valve wherein the sensor is positioned to sense the movement of the piston in relation to fluid pressure, and a controller connected to the variable speed pump and the sensor and operable to adjust the speed of the variable speed pump based upon a sensed displacement of the piston.

8. The system of claim 7 wherein the by-pass control valve has a piston disposed in a hollow tube that separates the tube into a fluid chamber and an air chamber.

9. The system of claim 7 wherein a pair of sensors are disposed within the tube and connected to the controller, the sensors positioned to sense the movement of the piston.

10. The system of claim 7 wherein a photoelectric sensor is positioned on the lid and connected to the controller, the sensor positioned to sense the relative position of the piston.

11. The system of claim 5 wherein a source of pressurized air is connected to and supplies pressurized air to the by-pass control valve.

12. A method of maintaining injection pressure within a meat injection system, comprising the steps of:
- providing pressurized air to a master/command chamber of a by-pass control valve,
- transporting fluid from a variable speed pump to a meat injection machine and a control chamber of the by-pass control valve;
- sensing the position of a piston with a displacement sensor disposed within or outside the by-pass control valve where the position of the piston is based on fluid pressure in the control chamber acting on one end of the piston and air pressure in the master/command chamber acting on an opposite end of the piston; and
- automatically adjusting the speed of the variable speed pump based on the sensed position of the piston.

* * * * *